Oct. 23, 1962     O. GRIFFIS     3,059,872
CONVERTIBLE AUTOMATIC FISHING REEL

Filed March 31, 1960     3 Sheets-Sheet 1

INVENTOR
OBA GRIFFIS
BY Gustave Miller
ATTORNEY

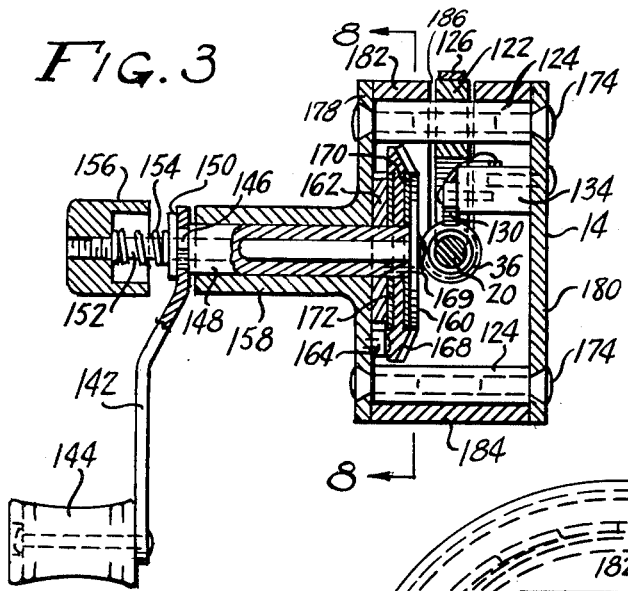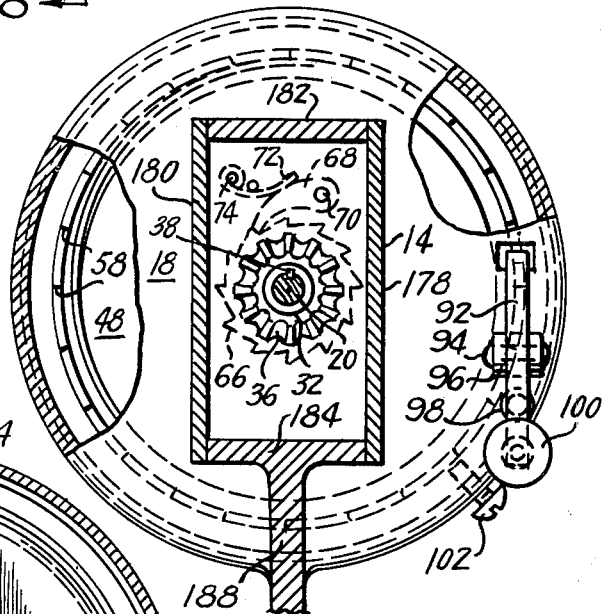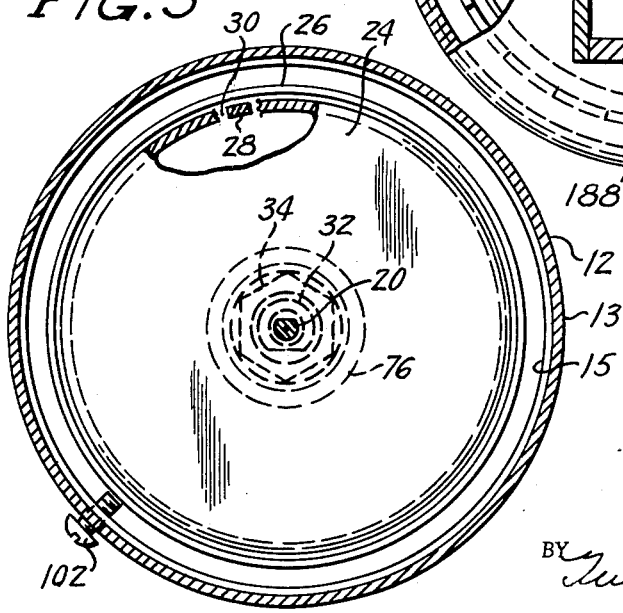

Oct. 23, 1962  O. GRIFFIS  3,059,872
CONVERTIBLE AUTOMATIC FISHING REEL
Filed March 31, 1960  3 Sheets-Sheet 3
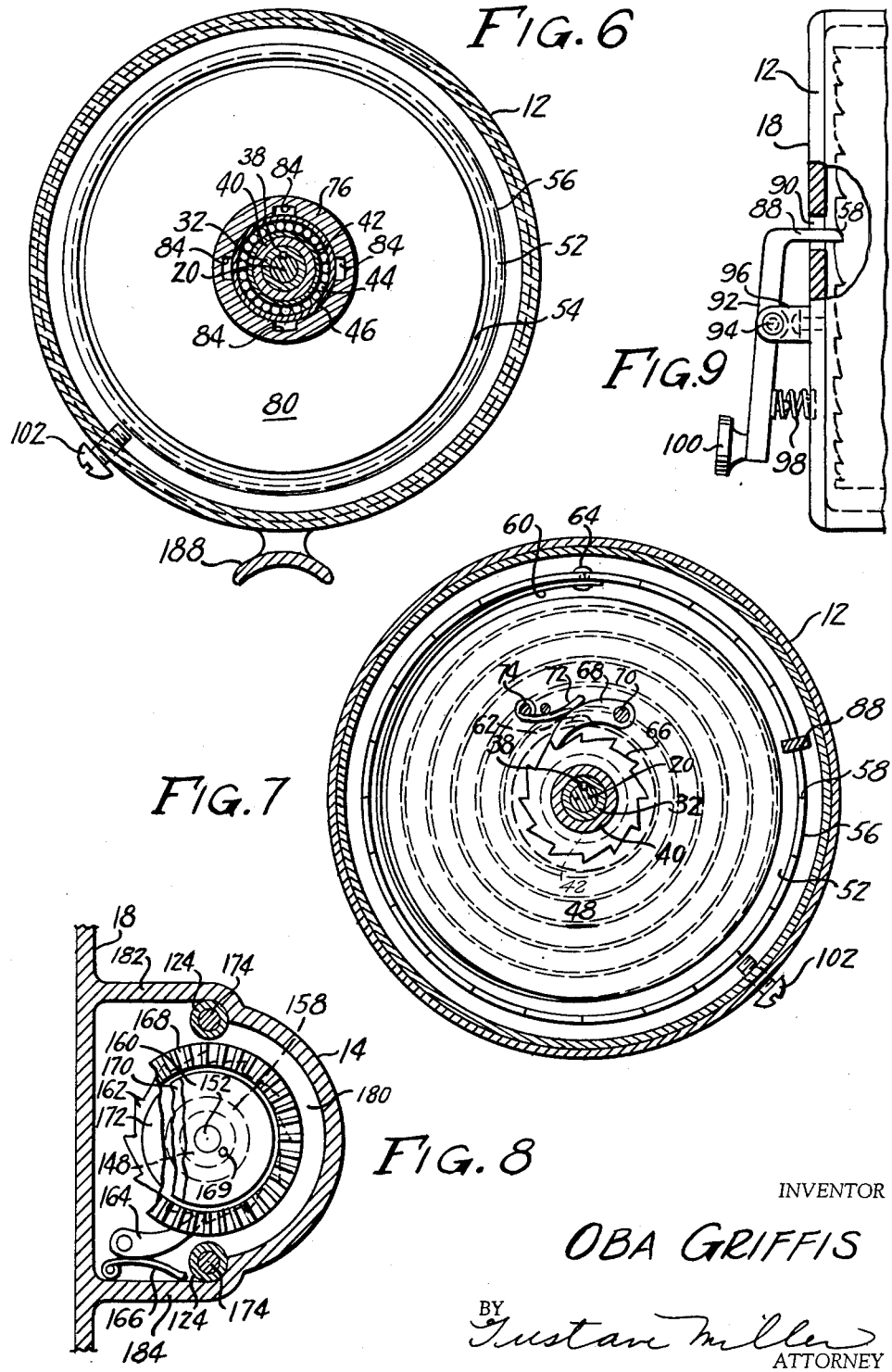
INVENTOR
OBA GRIFFIS
BY Gustave Miller
ATTORNEY

United States Patent Office 3,059,872
Patented Oct. 23, 1962

3,059,872
CONVERTIBLE AUTOMATIC FISHING REEL
Oba Griffis, Mobile, Ala.
(4441 Walter Circle, Whistler, Ala.)
Filed Mar. 31, 1960, Ser. No. 19,089
5 Claims. (Cl. 242—84.2)

This invention relates to fishing reels, and it more particularly relates to improved, convertible automatic push button spin cast type fishing reels. This is a continuation-in-part of applicant's co-pending application Serial No. 830,930, filed July 31, 1959, and now abandoned.

As is well known, when casting with a push button spin cast fishing reel, the lure or bait is cast several yards upon the water. When the bait or lure strikes the water there is always a certain amount of slack line between the bait and the fishing reel. If the fish should strike the lure immediately after the lure hits the water, there would be sufficient slack in the line to allow the fish to spit out or shake loose the lure and escape.

It is the primary object of the present invention to prevent escape of fish in the aforesaid manner by providing a fishing reel which is capable of instantly removing the slack in the line whenever there is a bite on the line.

Another object of the present invention is to provide a fishing reel of the aforesaid type which permits the maintenance of a spring tension on the fishing line while retrieving the fish.

Another object of the present invention is to provide a fishing reel of the aforesaid type wherein spring tension can be applied to the line prior to the cast.

Another object of the present invention is to provide a fishing reel of the aforesaid type which can be easily and quickly converted from an automatic type to a conventional type spin cast reel.

Another object of the present invention is to provide a fishing reel of the aforesaid type which is relatively simple in construction and easy to use.

Other objects of the present invention are to provide an improved fishing reel, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which.

Figure 1:
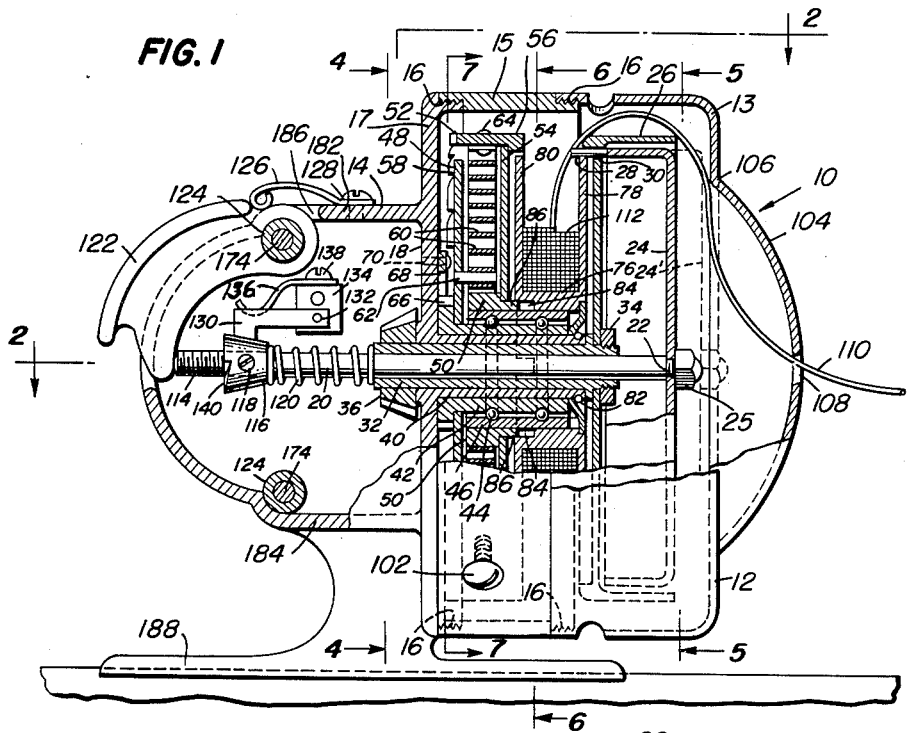
FIG. 1 is a side view, partly in section and partly in elevation, of a fishing reel embodying the present invention.
Figure 2:
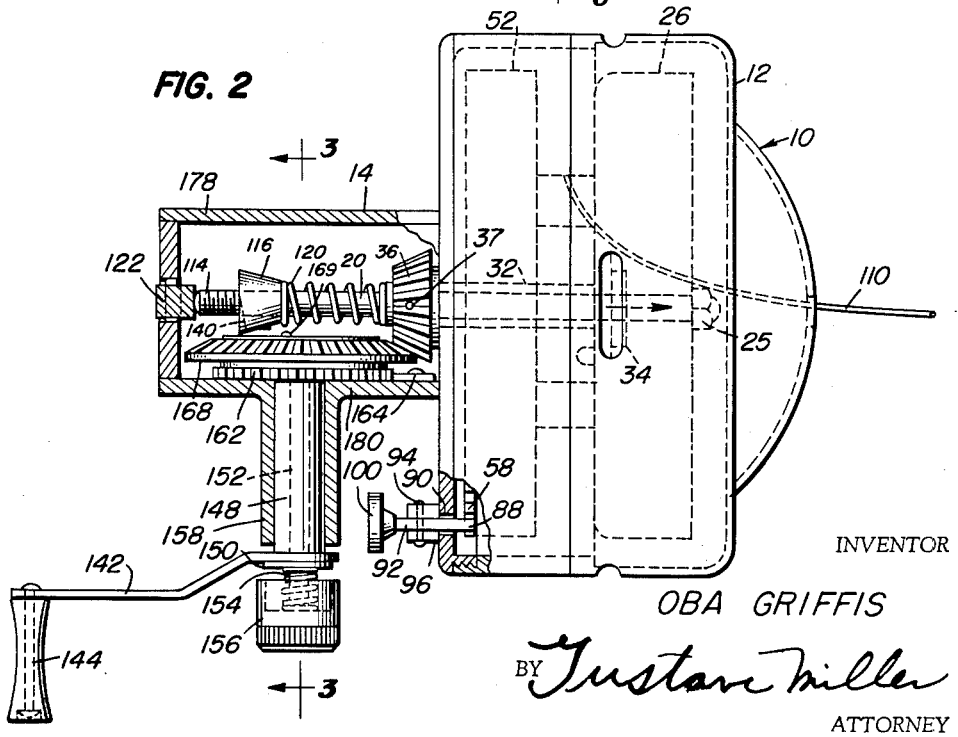
FIG. 2 is a view, partly in section and partly in elevation taken on line 2—2 of FIG. 1.

FIG. 3 is a sectional view taken on line 3—3 of FIG. 2.
FIG. 4 is a sectional view taken on line 4—4 of FIG. 1.
FIG. 5 is a sectional view taken on line 5—5 of FIG. 1.
FIG. 6 is a sectional view taken on line 6—6 of FIG. 1.
FIG. 7 is a sectional view taken on line 7—7 of FIG. 1.
FIG. 8 is a sectional view taken on line 8—8 of FIG. 3.
FIG. 9 is a fragmentary elevational view, partly broken away.

Referring in greater detail to the drawings wherein similar reference characters refer to similar parts, there is shown a fishing reel, generally designated 10, comprising a main housing 12 and an auxiliary housing 14 extending from one side of the main housing 12. The main housing 12 is preferably constructed of aluminum or similar material and is illustrated as comprising three separable sections 13, 15 and 17 held together by threaded portions indicated at 16 (see FIG. 1). These separable sections 13, 15 and 17 permit easy manufacture and assembly and also permit easy adjustment or replacement of parts within the housing. The housing 14 is also preferably constructed of the same material as housing 12 and is also preferably made up of separable sections.

A common wall 18 separates the housings 12 and 14 and this wall 18 is centrally apertured to permit the extension therethrough of a shaft 20. The end of the shaft 20 within the housing 12 is reduced, flattened on one side, and screw-threaded, as at 22, and passes through a complementary central aperture in a cup-shaped guide member 24 to which it is held by means of a lock nut 25. The cup-shaped guide member 24 is movable by means of axial movement of shaft 20 and is telescopically receivable within a second or outer but oppositely facing cup-shaped guide member 26 through which shaft 20 also extends. The open inner edge of the inner cup-shaped member 24 is further provided with a pick-up tongue 28 (see FIGS. 1 and 5) which is adapted to pass through a slot 30 in the outer cup-shaped member 26.

Coaxially mounted on shaft 20 within the housing 12, adjacent the cup-shaped members 24 and 26, is a sleeve 32. This sleeve 32 is threaded at one end where it extends through the central aperture of the outer cup-shaped member 26. It is secured to outer cup-shaped member 26 by means of a lock nut 34 on its threaded end.

The opposite end of sleeve 32 extends through the wall 18 into auxiliary housing 14 where it is provided with a bevel gear 36 secured thereto by pin 37. The shaft 20 and sleeve 32 are connected for simultaneous rotation by means of gear 36 by a key 38 positioned in mating keyways as shown in FIGS. 4 and 7. This key connection permits simultaneous rotational movement while also permitting independent axial movement.

The sleeve 32 is rotatably positioned within a hollow hub 40 of the housing 12, the hub 40 extending integrally from wall 18 thereof. Around the hub 40 is a rotatable sleeve 42 forming the inner race of a ball bearing assembly. This inner race is provided with appropriate recesses to receive balls 44 which are also received in similar recesses in a sleeve 46 forming the outer race.

Mounted on the ball bearing assembly is a casing generally designated 52 for the loading spring. This casing comprises a disc 48 forming the rear wall and secured on the sleeve or inner race 42 and a hub 50 secured on the sleeve or outer race 46. The casing 52 also includes a front wall or disc 54 secured to the hub 50 and an outer peripheral wall 56 which is secured to front wall 54. The rear edge of peripheral wall 56 is further provided with an annular series of ratchet teeth 58.

Within the casing 52, there is provided a torsion spring 60 having its inner end connected to rear disc 48, and thus to inner race 42, by a pin 62 while its outer end is connected to peripheral wall 56 by a screw, rivet or the like indicated at 64. Thus, sleeve 42, disc 48 and pin 62 function as an integral unit, and similarly sleeve 46, hub 50, front wall or disc 54, and peripheral wall 52 with its teeth 58 function as another integral unit.

Rotatable inner race sleeve 42, to which disc 48 is secured, is integrally provided at its rear end with an annular series of ratchet teeth 66 engageable by a pawl 68 pivotally connected to the forward face of wall 18 by a pivot pin 70, as seen in FIGS. 1, 4 and 7, thus permitting the loading spring casing 52, consisting of the two integral units above mentioned, with their connecting torsion spring 60, to rotate as an entity in one direction only although the integral units can rotate relative to each other within the limits permitted by the torsion spring 60. The pawl is biased against the teeth 66 by a leaf spring 72 mounted on wall 18 at 74.

Between the outer cup-shaped member 26 and the wall or disc 54 of casing 52 there is provided a spool 76 comprising a hollow hub, supported by sleeve 46, and a pair of flanges or discs 78 and 80. The discs 78 and 80 are centrally apertured to mate with the central bore of the hub. The central aperture of disc 78 is defined by an inwardly inclined spring ring portion 82 which extends into a groove at the end of sleeve 40.

The hub of spool 76 is provided at its rear edge with a plurality of slots 84. These slots 84 releasably receive complementary fingers 86 extending from hub 50 to secure spool 76 to hub 50 and outer race 46 and cause spool 76 to rotate with hub 50 and its unit parts.

The teeth 58 on the casing 52 are releasably engageable by pawl 88 (see FIGS. 2 and 9) which extends into the housing 12 through an opening 90. The pawl 88 is integral with a lever 92 pivotally connected at 94 to a bracket 96 on the outside of housing 12. A spring 98 bears on the lever 92 to urge pawl 88 into engagement with the ratchet teeth 58, while a button 100 is provided at the end of lever 92 to permit finger pressure for moving the lever against the force of spring 98.

A set screw 102 projects through the housing 12 and is adapted to frictionally engage the peripheral wall 56 of the casing 52. When the screw 102 is so engaged, it acts to prevent rotation of the casing 52, while when the screw is moved away from the casing 52, it permits it to rotate under pressure of spring 60 when it is loaded.

The front face of housing 12 is provided with an outwardly bulging, hemispherical portion 104. Between the portion 104 and the remaining portion of the front wall of housing 12 there is provided an annular shoulder 106. The portion 104 is provided at its apex with an aperture 108 through which a fishing line 110 extends. This line 110 is wound on the spool 76, as shown at 112.

The portion of shaft 20 which extends into auxiliary housing 14 is provided with a threaded end 114 upon which is adjustably positioned a beveled, internally-threaded cocking nut 116. The nut 116 is adapted to be retained in threadedly adjustable position on shaft 20 by means of a set-screw 118.

A coil spring 120 surrounds the shaft 20 between the nut 116 and the gear 36 and acts to resiliently urge the shaft 20 rearwardly against a push button 122. The button 122 is pivoted on a sleeve 124 in the housing 14 and is resiliently held against the end of shaft 20 by a leaf spring 126 connected at 128 to the housing 14.

A pawl 130 is pivoted at 132 to a bracket 134 in housing 14. This pawl 130 is urged against the beveled outer surface of the nut 116 by a leaf spring 136 connected at 138 to the bracket 134. Normally, the pawl 130 will rest on the nut 116 as in FIG. 1. However, when the button 122 is pushed in, against the pressure of spring 120, the pawl 130 falls behind the nut 116 and thereupon acts to retain the shaft 20 in the extended position, against the pressure of spring 120. This moves the inner cup-shaped member 24 to the dash line position 24' shown in FIG. 1, and moves tongue or finger 28 out of slot 30 in outer cup-shaped member 26 and also out of contact with line 110 coming off of spool 76, thereby permitting line 110 to be pulled freely through aperture 108.

In order to return the shaft 20 to its normal position, the nut 116 is provided with a notch 140. This notch 140 is cut into the outer back wall of nut 116, and provides a surface camming outwardly from the threads 114 to the beveled cam face of nut 116. When the shaft 20 is rotated to bring this notch 140 into alignment with the pawl 130, the spring 120 can then push back the shaft 20 so that, as rotation continues, the pawl 130 is again lifted up onto the beveled cam face of nut 116, and the parts thereupon return to their normal position, with the tongue again extending into slot 30 of the outer cup-shaped member 26.

The shaft 20 is rotated by means of a crank arm 142 having a handle 144. The arm 142 is mounted on a square, reduced end 146 of a hollow shaft 148. It is held in place by a washer 150 mounted on a solid shaft 152 which extends through the hollow shaft 148. The washer 150 is held against the arm 142 by one end of a coil spring 154, the other end of which bears against a nut 156 threadedly engaged on the end of shaft 152.

The shafts 148 and 152 extend through a hollow boss 158 of the auxiliary housing 14 into the housing 14 itself. Within the housing 14, the solid shaft 152 extends beyond the end of hollow shaft 148 and this extending end of solid shaft 152 is provided with a head 160 fixedly secured thereto. The hollow shaft 148, within housing 14, is provided with a circular ratchet 162 fixedly secured thereto and engageable by a pawl 164 biased toward the ratchet by a leaf spring 166.

Between the ratchet 162 and the head 160 there is provided a bevel gear 168 rotatably mounted about the hollow shaft 148. A pin 169 fixed in the head 160 extending parallel and close to shaft 152 extends into a complementary recess in the end of hollow shaft 148, as seen in FIGS. 2, 3 and 8 to act as a key to cause shaft 152 and head 160 to rotate with hollow shaft 148, yet permit solid shaft 152 to move axially of hollow shaft 148 under action of nut 156 and coil spring 154. The bevel gear 168 is provided with a recess on each of its opposite faces and in these recesses are positioned nylon washers 170 and 172. These washers 170 and 172 act as frictional clutch means which are held against the gear 168 by the head 160 on one side and the ratchet 162 on the other side, both the head 160 and ratchet 162 being pressed against the washers 170 and 172 by the spring 154. With sufficient pressure, the bevel gear 168 rotates with the head 160 and ratchet 162 to thus be rotated by operation of crank handle 144. This pressure is adjustable by rotating the nut 156 on the threaded end of shaft 152 to vary the tension of the spring 154.

The washers 170 and 172 form a drag means which frictionally opposes an opposite tension on the line 110 up to a predetermined point, this predetermined point being variable by adjustment of nut 156. Up to this predetermined point, therefore, the drag means will prevent rotation of the spool to play out more line.

As best seen in FIG. 3, the auxiliary housing 14 comprises oppositely disposed side walls 178 and 180 held apart by spacer sleeves 124, the upper one of which acts as a pivot for the push button 122, as pointed out above. The sleeves 124 are held in place by pin and sleeve screws 174. Between the side walls 178 and (as best shown in FIG. 4) 180 are top and bottom walls 182 and 184, all combining to form a generally rectangular shape. The top wall 182 is, furthermore, slotted at 186 to accommodate the push button 122. Depending from the lower wall 184 is a mounting bracket 188, of the standard type, for mounting the reel on a fishing rod.

In operation, the push button 122 is pushed in to move shaft 20 forwardly. This moves inner cup-shaped member 24 forwardly, thereby moving the pick up tongue 28 out of its overlying position relative to the spool 76. This permits the line 110 to freely move off the spool. After the desired amount of line is played out, the crank arm 142 is rotated to bring notch 140 of nut 116 into alignment with pawl 130, thereby permitting spring 120 to retract the shaft 20 into the retrieving position.

With the reel in retrieving position, the spring 60 is tensioned or "loaded" either by pulling on the line 110 to turn the spool or by winding the arm 142 until the hook or bait on the end of the line reaches the tip of the fishing rod and can go no further, and then continuing to wind until the spring 60 reaches the pre-set drag tension point. The device is now ready for casting.

In casting, the push button 122 is pushed in again to move the shaft 20 and member 24 forwardly all the way to the position 24' to press the line 110 against shoulder 106 to hold the line firm. The cast is then made.

After the cast is made, the crank arm 142 is rotated to release the shaft 20 and bring the device back into retrieving position. Then, when a fish strikes it is only necessary to immediately press button 100. This retracts pawl 88 from ratchet teeth 58, thereby permitting the outer casing portion 56 to rotate under released force of spring 60. This tensions line 110 and sets the hook in the fish before the fish can spit out the hook.

On the other hand, when it is desired to use the device without its automatic feature, it is merely necessary to tighten the set screw 102 against the casing 52. This prevents any rotation of the casing wall 56 and therefore prevents operation of the spring 60.

During the automatic operation of the device, the various parts are effectively held against undesirable slippage by means of the various ratchet mechanisms. In this respect, the pawl 68 and ratchet teeth 66 act to retain the rear portion of the casing 52 against movement while the spring 60 is being loaded, whereas the pawl 164 and ratchet teeth 162 act to retain gear 168 in rotatably adjusted position.

Although this invention has been described in considerable detail, such description is intended as being illustrative rather than limiting, since the invention may be variously embodied, and the scope of the invention is to be determined as claimed.

Having thus set forth and described the nature of this invention, what is claimed is:

1. A fishing reel comprising a substantially cylindrical main housing and an auxiliary housing secured together by a circular common wall, a hollow hub extending integrally from said common wall axially thereof into said main housing, a rotatable sleeve journaled through said hollow hub and having an end in each said housing, a shaft extending axially through said sleeve beyond both ends of said sleeve, axially extending key means between said sleeve and said shaft permitting axial movement of said shaft through said sleeve but keying said shaft to said sleeve for simultaneous rotational movement therewith, a bevel gear secured on the end of said sleeve within said auxiliary housing, a second bevel gear in mesh with said first mentioned bevel gear, manually operable rotatable shaft means extending through one side of said auxiliary housing, clutch means connecting said second bevel gear to said manually operable shaft means, pawl and ratchet means between said manually operable shaft means and said auxiliary housing permitting rotation of said shaft means in one direction only, a push button pivoted on said auxiliary housing in contact with the end of said axial shaft in said auxiliary housing for axially depressing said axial shaft through said sleeve, a cocking cam secured on said axial shaft end within said auxiliary housing, a spring coiled about said axial shaft biasing said axial shaft against said push button, a spring loaded pawl coacting with said cam to retain said axial shaft depressed against said biasing spring, said cam having a pawl releasing cam surface operable when said cam and axial shaft are rotated, a two unit spring casing assembly in said main housing coaxial with said axial shaft and journaled about said hollow hub, a torsion spring connected to both said units permitting rotation of one unit relative to the other in tensioning and releasing the tension in said torsion spring, spring loaded pawl and ratchet means between said main housing and said first unit of said casing assembly permitting forward rotation of said first unit of said casing assembly in one direction only, a ratchet means on said second unit of said casing assembly, a spring loaded pawl mounted through said common housing wall and engageable with said last mentioned ratchet means preventing reverse relation of said second unit under tension of said torsion spring while engaged, push button means on said last mentioned pawl for disengaging said pawl to release said second unit for quick reverse rotation by said torsion spring, said last mentioned pawl and ratchet means permitting said second unit of said casing assembly to rotate in said one forward direction, a fishing line spool secured to said second casing assembly unit for rotation therewith, a fishing line wound about said spool in a direction to wind said torsion spring when pulled, and fishing line pick up cooperating means mounted on said axial sleeve and said axial shaft.

2. The fishing reel of claim 1, said fishing line pick up cooperating means comprising a pair of reversely cup-shaped members, the first said cup-shaped member being secured on said sleeve adjacent said spool, the second said cup-shaped member being secured on said axial shaft and having its rim telescoped with the rim of said first cup-shaped member, a fishing line pick up finger extending from the rim of said second cup-shaped member through a slot in said first cup-shaped member into a position to overlie an edge of said fishing line spool and engage said fishing line as said fishing line extends from said spool, said pick up finger being disengageable from said fishing line by depression of said push button on said auxiliary housing to axially move said axial shaft to permit unhampered unreeling of said fishing line.

3. The fishing reel of claim 2, said main housing having an aperture aligned with said axial shaft through which said fishing line extends from said spool, an internal shoulder on said main housing in the path of maximum axial movement of said second cup-shaped member on said axial shaft under push button pressure on said axial shaft, said second cup-shaped member cooperating with said internal shoulder to pinch and hold said fishing line between said spool and said main housing fishing line aperture.

4. The fishing reel of claim 1, and means extending through said main housing for locking said casing assembly against rotation and converting said fishing reel to non-automatic operation.

5. The fishing reel of claim 1, said manually operable rotatable shaft means comprising a hollow shaft, a crank arm and handle fixed to one end of said hollow shaft outside said auxiliary housing, said ratchet therefor being fixed to the other end of said hollow shaft within said auxiliary housing, a shaft extending coaxially through said hollow shaft, a head fixed on the inside end of said coaxially extending shaft, said second bevel gear being mounted about said hollow shaft between said ratchet thereon and said head on said coaxially extending shaft, said clutch means including clutch face means between opposite sides of said second bevel gear and said head on one side and said ratchet on the other side, the outside end of said coaxial shaft extending beyond said crank arm secured on said hollow shaft, said outside end being threaded, a knurled nut adjustable on said threaded end of said coaxial shaft and a coil spring about said threaded end biased between said crank arm and said hollow shaft, whereby the pressure of said clutch means may be adjusted to control the pressure at which the fishing line spool may rotate under fishing line tension.

References Cited in the file of this patent

UNITED STATES PATENTS

| 1,481,722 | Maury | Jan. 22, 1924 |
| 1,914,470 | White | June 20, 1933 |
| 2,613,468 | Hand | Oct. 14, 1952 |
| 2,723,808 | Elliott et al. | Nov. 15, 1955 |
| 2,777,645 | Wood | Jan. 15, 1957 |
| 2,843,333 | Jones | July 15, 1958 |
| 2,854,200 | Montgomery | Sept. 30, 1958 |
| 2,903,202 | Sarah | Sept. 8, 1959 |
| 2,910,252 | Joy | Oct. 27, 1959 |
| 2,931,592 | Sloan | Apr. 5, 1959 |

FOREIGN PATENTS

| 452,614 | Italy | Oct. 28, 1949 |